United States Patent
Li et al.

(10) Patent No.: US 11,409,462 B2
(45) Date of Patent: Aug. 9, 2022

(54) DATA REMOVAL MARKING IN A MEMORY DEVICE

(71) Applicant: Micron Technology, Inc., Boise, ID (US)

(72) Inventors: Huachen Li, Shanghai (CN); Xu Zhang, Shanghai (CN); Zhong Xian Li, Shanghai (CN); Xinghui Duan, Shanghai (CN); Xing Wang, Shanghai (CN); Tian Liang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 214 days.

(21) Appl. No.: 16/959,064

(22) PCT Filed: Dec. 31, 2019

(86) PCT No.: PCT/CN2019/130387
§ 371 (c)(1),
(2) Date: Jun. 29, 2020

(87) PCT Pub. No.: WO2021/134431
PCT Pub. Date: Jul. 8, 2021

(65) Prior Publication Data
US 2021/0405918 A1 Dec. 30, 2021

(51) Int. Cl.
*G06F 3/06* (2006.01)
*G06F 12/02* (2006.01)
*G06F 12/0882* (2016.01)

(52) U.S. Cl.
CPC .......... *G06F 3/0656* (2013.01); *G06F 3/0604* (2013.01); *G06F 3/0652* (2013.01); *G06F 3/0659* (2013.01); *G06F 3/0679* (2013.01); *G06F 12/0246* (2013.01); *G06F 12/0882* (2013.01); *G06F 2212/7201* (2013.01);
(Continued)

(58) Field of Classification Search
None
See application file for complete search history.

(56) References Cited

U.S. PATENT DOCUMENTS 10,248,333 B1  4/2019  Shah et al.
11,144,448 B2 * 10/2021  Gyllenskog ......... G06F 12/0246
(Continued)

OTHER PUBLICATIONS

"International Application Serial No. PCT CN2019 130387, International Search Report dated Oct. 10, 2020", 4 pgs.
(Continued)

*Primary Examiner* — Nathan Sadler
(74) *Attorney, Agent, or Firm* — Schwegman Lundberg & Woessner, P.A.

(57) ABSTRACT

Devices and techniques for data removal marking in a memory device are described herein. A delete command can be received at the memory device. A count of data portions in the delete command can be compared to determine whether the count is below a threshold. In response to determining that the count of data portions is below the threshold, the data portions can be written to a buffer. When a buffer full event is detected, a segment of an L2P data structure can be loaded into working memory of the memory device. Then, each record in the segment of the L2P data structure that has a corresponding entry in the buffer can be updated to mark the data as removable (e.g., invalid).

24 Claims, 6 Drawing Sheets

(52) U.S. Cl.
 CPC ............... *G06F 2212/7205* (2013.01); *G06F 2212/7209* (2013.01)

(56) References Cited

U.S. PATENT DOCUMENTS

| | | |
|---|---|---|
| 2008/0263305 A1 | 10/2008 | Shu et al. |
| 2013/0219106 A1* | 8/2013 | Vogan ................. G06F 12/0246 711/E12.008 |
| 2016/0117252 A1* | 4/2016 | Thangaraj ........... G06F 12/0873 711/118 |
| 2016/0246530 A1 | 8/2016 | Mylavarapu |
| 2017/0160957 A1* | 6/2017 | Thangaraj ............... G06F 3/064 |
| 2018/0203637 A1* | 7/2018 | Furuya .................. G06F 3/0641 |
| 2019/0303285 A1* | 10/2019 | Park ....................... G06F 3/0631 |
| 2020/0057724 A1* | 2/2020 | Byun .................... G06F 3/0679 |
| 2020/0167235 A1* | 5/2020 | Chai ..................... G06F 3/0619 |

OTHER PUBLICATIONS

"International Application Serial No. PCT CN2019 130387, Written Opinion dated Oct. 10, 2020", 4 pgs.

* cited by examiner

DATA REMOVAL MARKING IN A MEMORY DEVICE

PRIORITY APPLICATION

This application is a U.S. National Stage Application under 35 U.S.C. 371 from International Application No. PCT/CN2019/130387, filed 31 Dec. 2019, which is incorporated herein by reference in its entirety.

Embodiments described herein generally relate to devices and techniques to remove data from memory devices. Here, data removal marking addresses devices that have internal processes to erase data that often occurs at a time different than the receipt of the data removal command. Thus, the data is marked for erasure rather than actually erased.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Memory is typically described and organized by logical blocks that are virtual, and physical blocks. While physical blocks refer to (e.g., are addresses of) physical structures (e.g., locations) in the memory devices, logical blocks are conceptual analogues that provide flexible interfaces to the physical blocks. Thus, for example, if a memory device moves data from one physical block to another—for example to garbage collect the first physical block—a relationship from the first physical block to a corresponding logical block can be transferred without interrupting host operations that access the data via the logical block. The relationship between physical and logical blocks is generally maintained in a data structure, which may be referred to as a logical-to-physical (L2P) map (e.g., table, list, dictionary, or other data structure). As the physical structure of the memory device increases in size and complexity, often, so too does the L2P mapping.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Some memory technologies, such as NAND flash, do not overwrite data in storage devices (e.g., cells), but rather actively set the storage devices to a known state to erase the now deleted data. Thus, when a host deletes a file on the memory device, the host generally sends a command to the memory device that informs the memory device that the data is no longer valid, signaling that the memory device can safely to erase the data. Erasure is then usually performed during a maintenance operation, such as garbage collection, to free the storage devices to hold new data. Thus, the command marks the data for removal. A variety of protocols, such as UFS, label this command UNMAP. If the host did not signal the memory device, the memory device would consider the now unused data to be valid, moving it from block to block in accordance with existing maintenance operations. Such behavior can result in poor memory device performance or longevity.

During operation, a host transmits an UNMAP command, or the like, to the memory device. The memory device updates its record keeping data structures, such as a logical-to-physical (L2P) data structure to reflect the changed state of logical addresses (e.g., logical block addresses (LBAs)). Often, in NAND devices, a valid page count (VPC) is decremented in affected blocks as well. The L2P mapping data structure is often used to locate the appropriate VPC value to decrement. Thus, L2P mapping performance figures prominently in data removal marking.

As storage arrays become larger in memory devices, the L2P data structure has also grown. When a controller for the memory device—whether internal or external to the memory device—has access to sufficient working memory (e.g., random access memory (RAM)), the L2P data structure can be loaded into the working memory and efficiently updated upon receipt of the data removal command. However, in memory device with a controller with limited working memory—such is the case in many memory devices installed in mobile computing devices—the entirety of the L2P data structure cannot fit within the working memory. In these cases, the L2P data structure is often segmented such that a single segment can be loaded into the working memory. The remainder of the L2P data structure is usually stored within an array of the memory device.

Loaded L2P segments into working memory introduces significant latency to L2P data structure modifications. Thus, a data removal marking command can impact memory device performance as different L2P data structure segments are loaded into the working memory to update each data portion specified in the data removal marking command. Thus, L2P update performance can be improved by reducing the number of L2P data structure segment loads are performed.

When the number of data portions specified in the data removal marking command are large, L2P data structure segment loads can be minimized by updating every entry in a given L2P data structure segment that has a corresponding data portion in the data removal marking command. In this manner, no L2P data structure segment is loaded more than once to complete the L2P update. In the context of the UNMAP command, the chunk size defines the large data removal marking command. Typically, large chunk size UNMAP commands specify data portions that are one gigabyte or larger.

When the number of data portions in the data removal marking command are small, however, a situation can arise in which the same L2P data structure segment is repeatedly loaded into the working memory in a short time period; each of these loads increasing latency. Such a small data removal marking command, in the UNMAP context, is specified by a small chunk size marker, and typically the data portions are small multiples of four kilobytes.

To improve L2P update performance for data removal marking commands that specify a small amount of data (e.g., are below a threshold) are accumulated in a journal or buffer. When the buffer is full enough—such as when a certain percentage of the buffer is full, or the number of entries in the buffer is beyond a defined value—L2P data structure segments are loaded into the working memory and every entry that has a corresponding data portion in the buffer is updated. Due to temporal locality, data portions (e.g., LBAs) within one L2P data structure segment can be unmapped in a short period of time. In contrast, when the data removal marking commands specifies a large amount of data (e.g., data portions beyond the threshold), then the buffer is not used, but rather the L2P update is processed immediately. Here, immediate handling tends to be more efficient because the number of data portions is likely to immediately fill the buffer, causing the operations to load the commands into the buffer to be wasted. Additional details and examples are provided below.

The following notes provide context to the discussion herein. Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume. The term "memory system," is used herein as inclusive of one or more memory die, and any controller functionality for such memory die, when present; and thus includes individual memory devices, managed memory devices, and SSDs.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMCT™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard. The identified standards are provided only as example environments in which the described methods and structures may be utilized. Such methods and structures may be utilized in a variety of environments outside of the identified standards (or of any other actual or proposed standards), except as expressly indicated herein.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Figure 1:
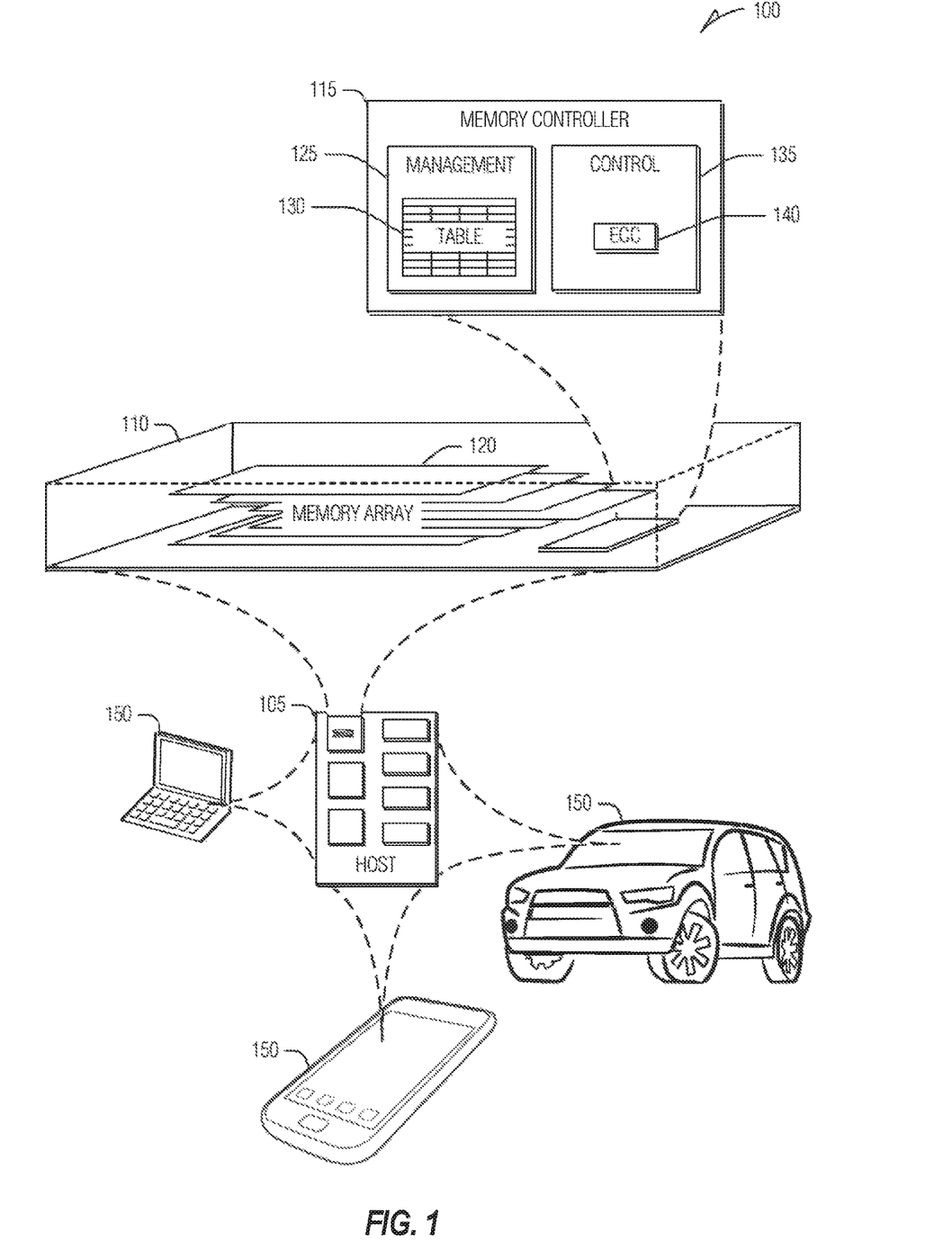
FIG. 1 illustrates an example of an environment including a memory device.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 600 of FIG. 6.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. For example, the memory controller 115 can include one or more memory control units, circuits, or components configured to control access across the memory array 120 and to provide a translation layer between the host 105 and the memory device 110.

The memory controller 115 includes processing circuitry, which may include one or more processors which, when present, operate to execute instructions stored in the memory device, and may include additional circuitry or components. For purposes of the present examples, the instructions will be discussed as firmware, though instructions may also be present as software; and all or some portion of the described functions may also be implemented in circuitry including one or more components or integrated circuits. In some examples, the functions of memory controller 115 are implemented by a processor executing the instructions of firmware which in some examples would be stored within the memory controller 115. In other examples, one or more processors within memory controller 115, may execute instructions stored in the memory array 120. Similarly, the management tables 130 used by the controller can be stored on the memory controller 115 or in memory array 120. In such examples the instructions and/or management tables 130 may be stored in certain blocks of the NAND die of memory array 120 and loaded into the working memory of memory controller 115 during operation. The memory controller 115 can include, among other things, circuitry or firmware, including one or more components or integrated circuits.

As noted above, the memory controller 115 is configured to receive data removal marking commands, or delete commands, from the host 105. The delete command (e.g., an UNMAP) command specifies data portions to be deleted. In an example, the data portions or pages, blocks, superblocks, or other addressable units of the memory array 120. Due to the function of technologies, such as NAND, the delete command signals the invalidity of the data portions, the actual implementation of the data erasure left up to the memory device 110.

The memory controller 115 is configured to compare a count of data portions in the delete command is compared to a threshold to determine that the count is below the threshold. This scenario signifies a "small" delete command, whereas a count above the threshold signifies a "large" delete command. The count can be a number of data portions or a space (e.g., in bytes) represented by the data portions. In an example, the delete command includes a flag to indicate the count. In an example, the flag does not signal the exact count of data, but rather characterizes the data as large or small, such as the large chuck size and small chunk size designation in a UFS UNMAP command.

In an example, the threshold is greater than sixteen kilobytes. In an example, the threshold is less than one gigabyte. These values largely correspond to the large and small chunk sizes in a UFS UNMAP command. In an example, the threshold is less than or equal to a size of a buffer in the memory device used to store the data portions prior to deletion. In an example, the size of the buffer is less than a size of a segment of the L2P data structure of the memory device. In an example, the size of the segment in the L2P data structure is 256 kilobytes. In an example, the size of the buffer is four kilobytes.

The memory controller 115 is configured to write the data portions in the buffer when the count is below the threshold. In an example, the data portions stored in the buffer are addresses, address ranges, or the like as stored in the L2P mapping data structure. If the count is greater than the threshold, then the data portions are not stored in the buffer. As explained elsewhere, storing the data portions of a large delete command generally leads to additional processing (e.g., populating the buffer) without reducing the number of L2P data structure segments to load into working memory.

The memory controller 115 is arranged to detect a buffer full event. In an example, the buffer full event occurs when the buffer is filled being beyond a fill level. This example recognizes that the buffer can be emptied before it is completely full. This can provide additional control such that the buffer is not filled part-way through a small delete command, possibly causing an error in updating the L2P data structure. In an example, the fill level is measured as a percentage of buffer size. In an example, the fill level is a preset value that is smaller than the buffer size.

The memory controller 115 is configured to load a segment of the L2P data structure into working memory and update each record in the L2P segment that has a corresponding entry in the buffer. The buffer entry is then removed once a corresponding record in the L2P data structure segment is updated. This procedure of loading a next L2P segment and processing each record with a corresponding buffer entry is repeated until the buffer is empty. Thus, each L2P segment implicated by the data portions in the buffer are loaded once, reducing repeat L2P segment loading and thus reducing the latency incurred from such loadings.

As noted above, in the case of a large delete command—a delete command with a data portion count above the threshold—the memory controller 115 is configured to process the L2P update directly from the command. Thus, the data portions in the large delete command are not stored in the buffer. However, similarly to the buffer-based operation above, the L2P data segments implicated by the data portions are loaded into the working memory in order to update the L2P mappings to indicate that the data is no longer valid data.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 130 can include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, for example when the memory array is a NAND array, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
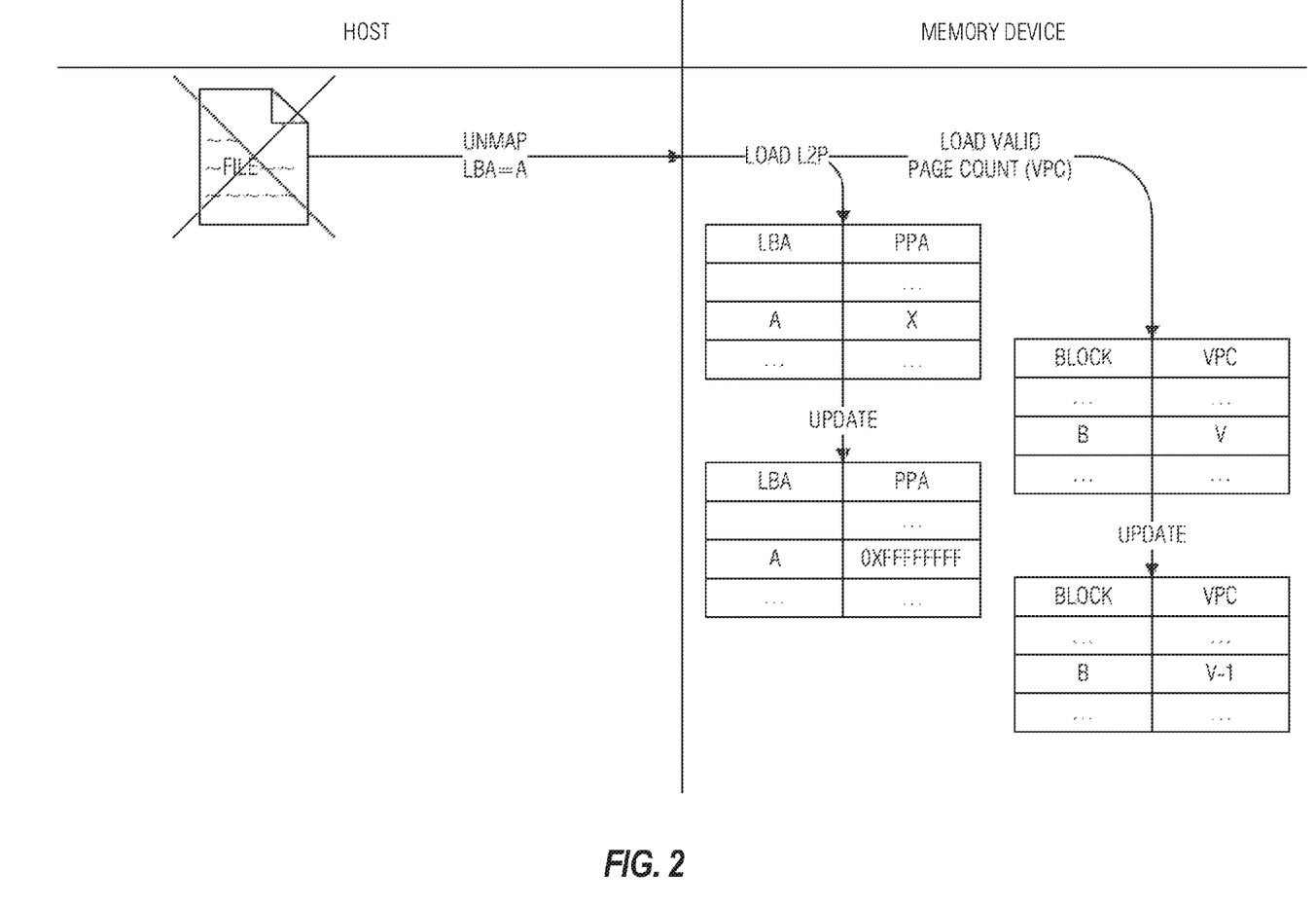
FIG. 2 illustrates an example of state during data removal marking.

FIG. 2 illustrates an example of state during data removal marking, as may be implemented by system 100 of FIG. 1. The example of FIG. 2 uses NAND LBAs to physical page address (PPA) units as entries in the L2P data structure. As illustrated, the PPA is updated from the address of a NAND physical page to an "invalid" value, here represented as 0xFFFFFFFF. The update decrements the VPC for the corresponding block. Generally, the VPC is used by the garbage collection process to determine when to free the block, the point when actual erasure of the data occurs.

Figure 3:
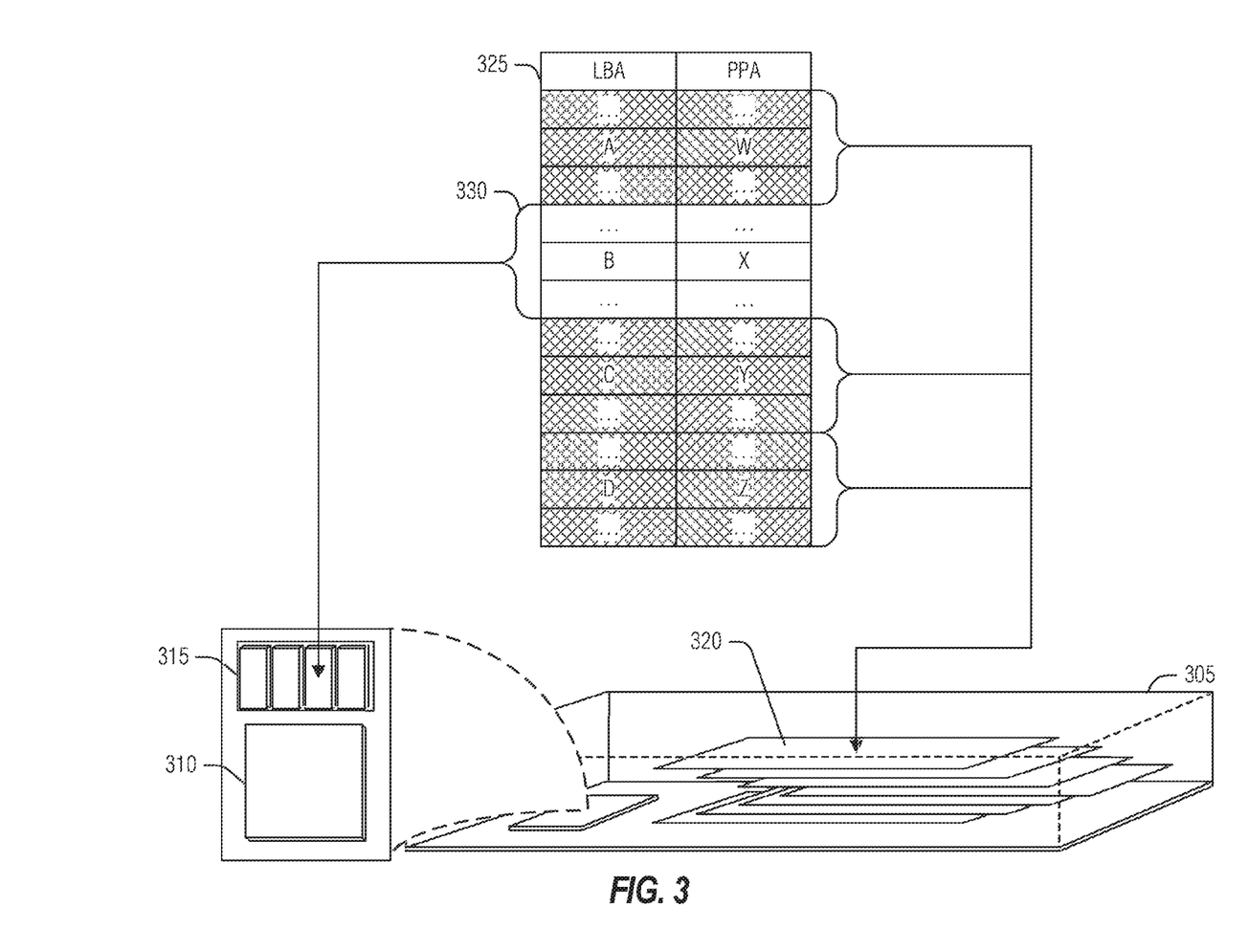
FIG. 3 illustrates an example of a segmented logical-to-physical (L2P) data structure loading on a memory device.

FIG. 3 illustrates an example of a segmented logical-to-physical (L2P) data structure loading on a memory device 305, analogous to memory device 110 of FIG. 1, As illustrated, the memory device 305 has a controller 310 with a working memory 315 that is too small to hold the entire L2P data structure 325 at one time. Thus, the L2P data structure 325 is divided into segments 330 (e.g., mapping pages). The L2P data structure 325 is stored in the memory array 320 and a relevant segment 330 is loaded into the working memory 315 as needed. After an update to the segment 330, the segment is flushed to the memory array 320. For context, in current managed NAND flash devices, the mapping page is often four kilobytes and includes 1024 entries (e.g., LBA-PPA entries illustrated in FIG. 2).

Figure 4:
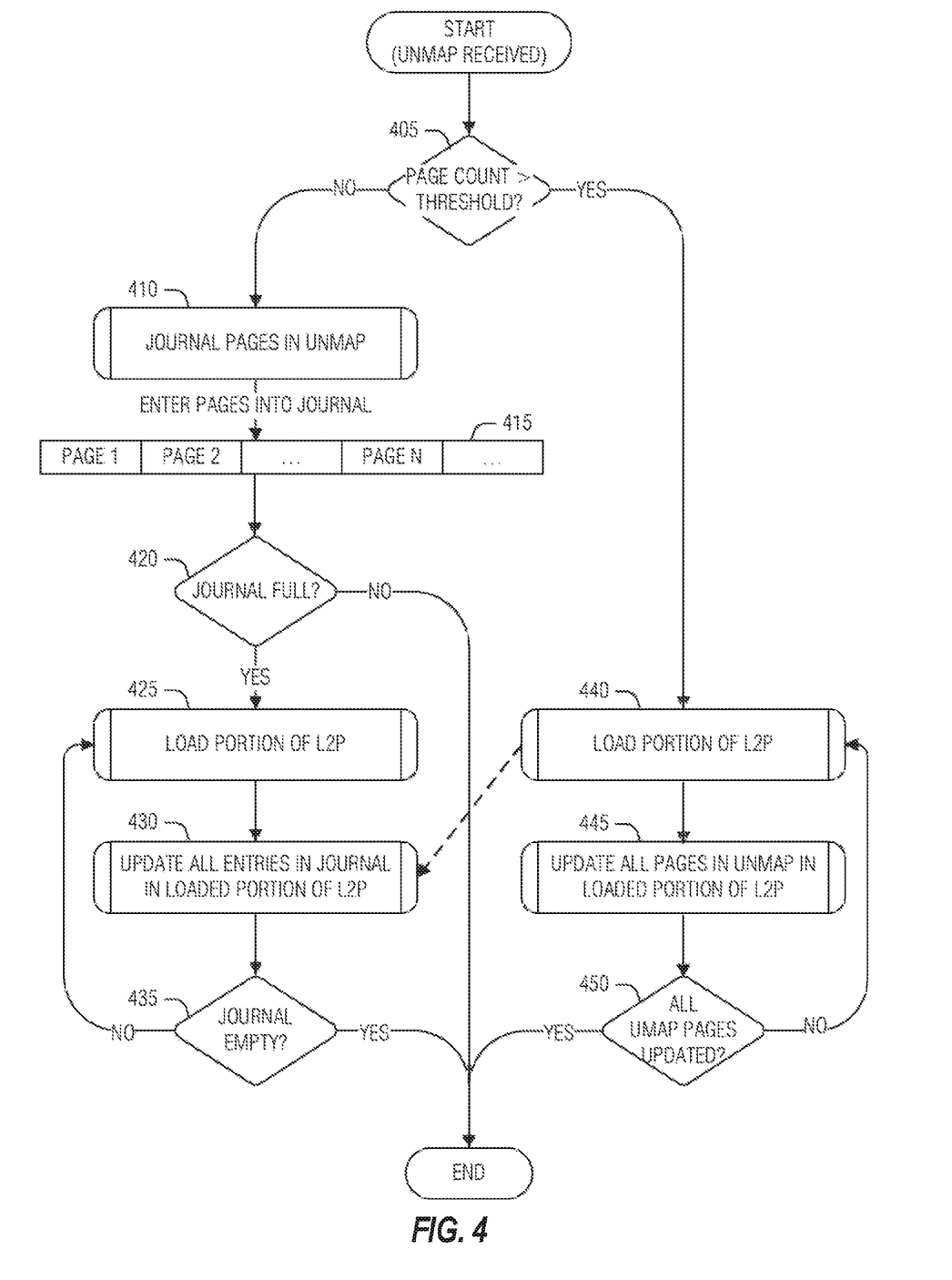
FIG. 4 illustrates an example of a workflow using an UNMAP journal to mark pages as deleted.

FIG. 4 illustrates an example of a workflow using an UNMAP journal to mark pages as deleted. After receiving the UNMAP command, the number of pages in the UNMAP command are compared to a threshold (decision 405). If the page count is greater than the threshold, a segment of the L2P data structure is loaded into working memory (e.g., as illustrated in FIG. 3) (operation 440) and the entries in the L2P segment that correspond to pages in the UNMAP command are updated (operation 445). If all of the UMAP pages have been updated (decision 450) the workflow ends. Else, the workflow continues by loading a next L2P data structure segment (operation 440). This is the large-chunk workflow. In an example, entries in the current loaded L2P segment that correspond to elements in the journal 415 (operation 430) can also be updated, the journal elements being removed after being updated. This optional operation can further reduce L2P segment loads by removing this L2P segment from needing to be loaded when the journal 415 is emptied.

If the UNMAP page count is below the threshold (decision 405)—a small-chunk UNMAP—then the pages are placed in the UNMAP journal 415 (e.g., buffer) (operation 410). If the journal is not full (e.g., above a fill level as discussed above) (decision 420), the workflow ends with no updates to the L2P data structure. However, if the journal is full (decision 420), an L2P segment is loaded into working memory (operation 425). Each entry in the L2P segment with a corresponding element in the journal 415 is updated and the element removed from the journal 415 (operation 430). If the journal is not empty (decision 435), then the workflow repeats by loading another L2P segment (operation 425). If the journal is empty (decision 435), then the workflow ends.

Figure 5:
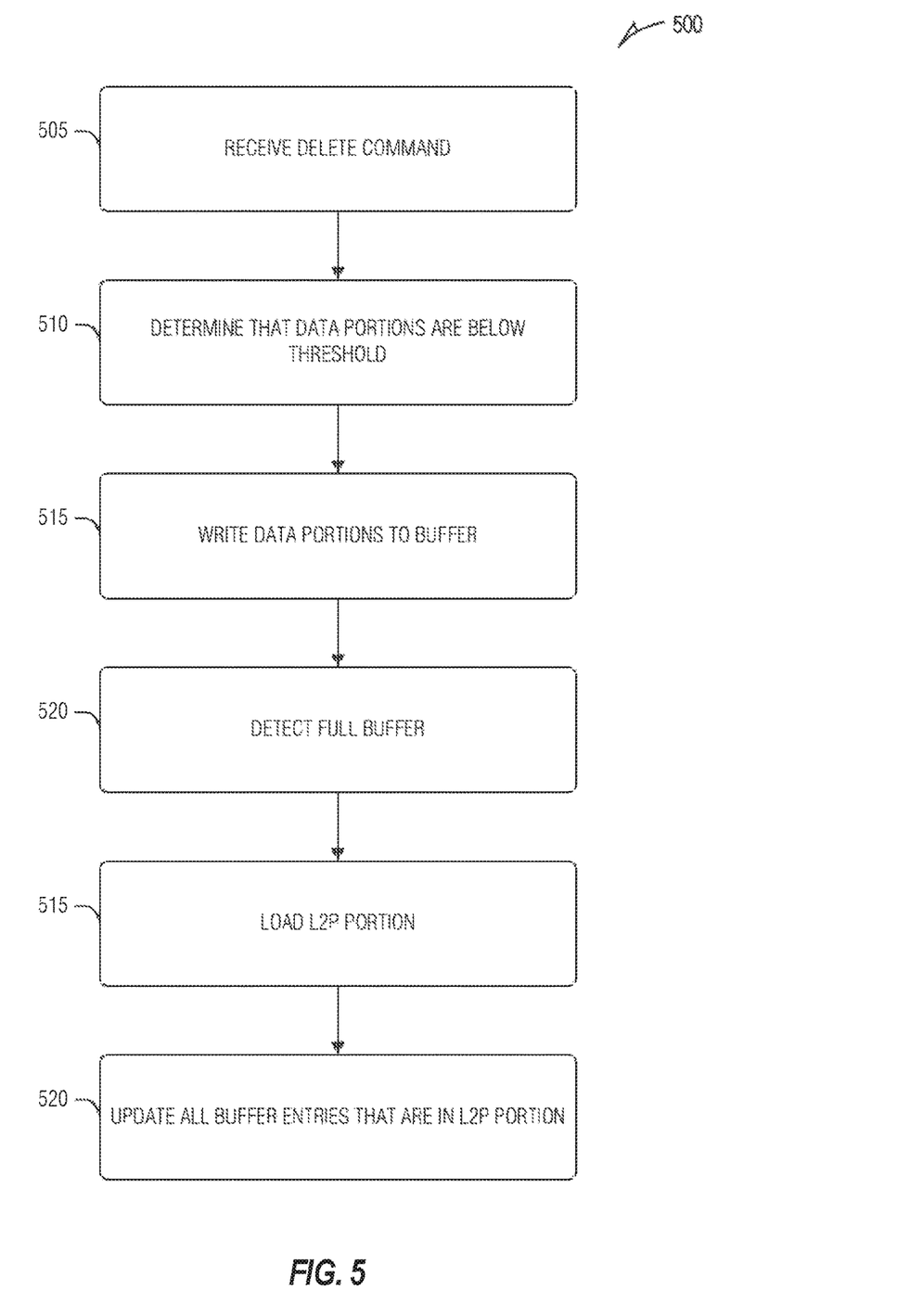
FIG. 5 illustrates a flowchart of an example of a method for data removal marking in a memory device.

FIG. 5 illustrates a flowchart of an example of a method 500 for data removal marking in a memory device. The operations of the method 500 are performed by computing hardware. An example of such computing hardware can include the memory controller 115 or other processing circuitry of the memory device 110 described above with respect to FIG. 1, other computer components, such as an external memory controller.

At operation 505, a delete command is received at the memory device. The command specifies one or more data portions to mark for removal. In an example, the data portion is a page of the memory device.

At operation 510, a count of data portions in the delete command is compared to a threshold to determine that the count is below the threshold. In an example, the threshold is greater than sixteen kilobytes. In an example, the threshold is less than one gigabyte. In an example, the threshold is less than or equal to a size of a buffer in the memory device used to store the data portions prior to deletion. In an example, the size of the buffer is less than a size of a segment of the L2P data structure of the memory device.

At operation 515, the data portions are written in a buffer when the count being below the threshold.

At operation 520, a buffer full event is detected. In an example, the buffer full event occurs when the buffer is filled being beyond a fill level. In an example, the fill level is measured as a percentage of buffer size or as a value that is smaller than the buffer size.

At operation 525, a segment of an L2P data structure is loaded in working memory of the memory device.

At operation 530, each record in the segment of the L2P data structure that has a corresponding entry in the buffer is updated. The buffer entry is then removed once a corresponding record in the L2P data structure segment is updated.

In an example, the method 500 is extended to repeatedly replace the segment of the L2P data structure in the working memory with a next segment of the L2P data structure into the working memory and update each record in the next segment of the L2P data structure that has a corresponding entry in the buffer until the buffer is empty. In an example, the method 500 is extended to receive a second delete command at a memory device. Here, a second count of data portions in the second delete command is compared to the threshold to determine that the count is above the threshold. The segment of the L2P data structure is loaded in working memory of the memory device without writing data portions in the second delete command to the buffer, Each record in the segment of the L2P data structure that has a corresponding entry in the second delete command is then updated. In an example, updating each record in the segment of the L2P data structure that has a corresponding entry in the delete command includes updating each record in the segment of the L2P data structure that has a corresponding entry in the buffer. Here, a buffer entry is removed once a corresponding record is updated.

Figure 6:
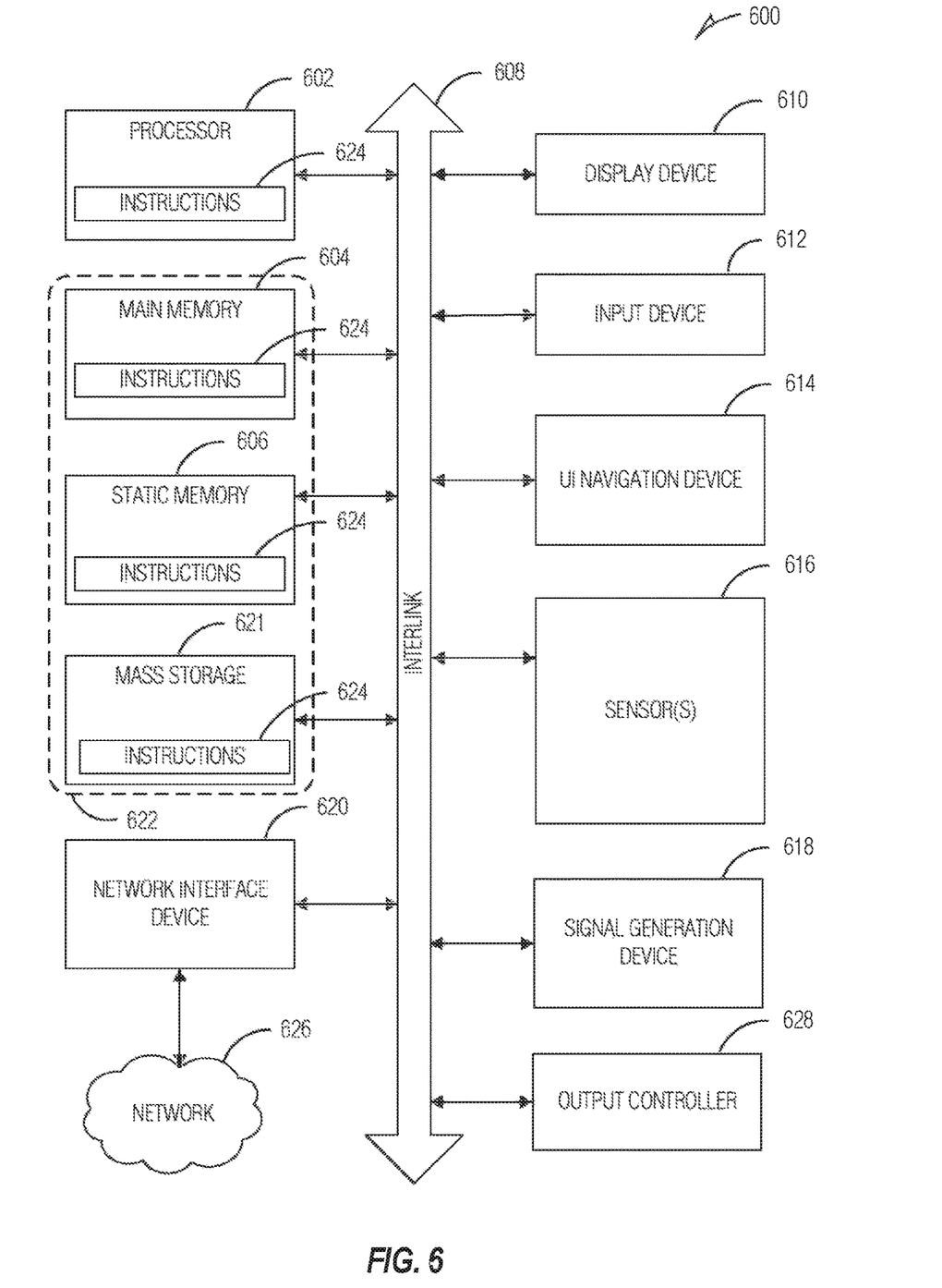
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. For example, any of the memory systems within machine 1100 (main memory 1104, static memory 1106, and mass storage 1121) may implement data marking and removal as discussed relative to FIGS. 1-5 herein. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.), Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 600 (e.g., the host device 105, the memory device 110, etc.) can include a hardware processor 602 (e.g., a central processing unit (CPU), a graphics processing unit (GPU), a hardware processor core, or any combination thereof, such as the memory controller 115, etc.), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 621, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute the machine readable medium 622.

While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data are stored on the storage device 621, can be accessed by the memory 604 for use by the processor 602. The memory 604 (e.g., DRAM) is typically fast, but volatile, and thus a different type of storage than the storage device 621 (e.g., an SSD), which is suitable for long-term storage, including while in an "off" condition. The instructions 624 or data in use by a user or the machine 600 are typically loaded in the memory 604 for use by the processor 602. When the memory 604 is full, virtual space from the storage device 621 can be allocated to supplement the memory 604; however, because the storage 621 device is typically slower than the memory 604, and write speeds are typically at least twice as slow as read speeds, use of virtual memory can greatly reduce user experience due to storage device latency (in contrast to the memory 604, e.g., DRAM). Further, use of the storage device 621 for virtual memory can greatly reduce the usable lifespan of the storage device 621.

In contrast to virtual memory, virtual memory compression (e.g., the Linux® kernel feature "ZRAM") uses part of the memory as compressed block storage to avoid paging to the storage device 621. Paging takes place in the compressed block until it is necessary to write such data to the storage device 621. Virtual memory compression increases the usable size of memory 604, while reducing wear on the storage device 621.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL EXAMPLES

Example 1 is a memory controller for data removal marking in a memory device, the memory controller comprising: storage including instructions; and processing circuitry that, when in operation, is configured by the instructions to: receive a delete command at the memory device; compare a count of data portions in the delete command to determine whether the count is below a threshold; in response to a determination that the count of data portions is below the threshold, write the data portions in a buffer; detect a buffer full event; load a segment of an L2P data structure in working memory of the memory device; and update each record in the segment of the L2P data structure that has a corresponding entry in the buffer, an entry being removed once a corresponding record is updated.

In Example 2, the subject matter of Example 1, wherein the processing circuitry is configured by the instructions to repeatedly, until the buffer is empty: replace the segment of the L2P data structure in the working memory with a next segment of the L2P data structure into the working memory; and update each record in the next segment of the L2P data structure that has a corresponding entry in the buffer.

In Example 3, the subject matter of any of Examples 1-2, wherein the processing circuitry is configured by the instructions to: receive a second delete command at a memory device; compare a second count of data portions in the second delete command to determine whether the count is above the threshold; in response to a determination that the count is above the threshold, load the segment of the L2P data structure in working memory of the memory device without writing data portions in the second delete command to the buffer; and update each record in the segment of the L2P data structure that has a corresponding entry in the second delete command.

In Example 4, the subject matter of Example 3, wherein, to update each record in the segment of the L2P data structure that has a corresponding entry in the delete command, the instructions configure the processing circuitry to: update each record in the segment of the L2P data structure that has a corresponding entry in the buffer, an entry being removed from the buffer once a corresponding record is updated.

In Example 5, the subject matter of any of Examples 1-4, wherein the buffer full event is the buffer being beyond a fill level, the fill level measured as a percentage of buffer size or as a value that is smaller than the buffer size.

In Example 6, the subject matter of any of Examples 1-5, wherein the threshold is greater than sixteen kilobytes.

In Example 7, the subject matter of any of Examples 1-6, wherein the threshold is less than one gigabyte.

In Example 8, the subject matter of any of Examples 1-7, wherein the threshold is less than or equal to a size of the buffer.

In Example 9, the subject matter of Example 8, wherein the size of the buffer is less than a size of the segment of the L2P data structure.

In Example 10, the subject matter of any of Examples 1-9, wherein a data portion is a page.

Example 11 is a method for data removal marking in a memory device, the method comprising: receiving a delete command at the memory device; comparing a count of data portions in the delete command to determine whether the count is below a threshold; in response to determining that the count of data portions is below the threshold, writing the data portions in a buffer; detecting a buffer full event; loading a segment of an L2P data structure in working memory of the memory device; and updating each record in the segment of the L2P data structure that has a corresponding entry in the buffer, an entry being removed once a corresponding record is updated.

In Example 12, the subject matter of Example 11, comprising, repeatedly, until the buffer is empty: replacing the segment of the L2P data structure in the working memory with a next segment of the L2P data structure into the working memory; and updating each record in the next segment of the L2P data structure that has a corresponding entry in the buffer.

In Example 13, the subject matter of any of Examples 11-12, comprising: receiving a second delete command at a memory device; comparing a second count of data portions in the second delete command to determine whether the count is above the threshold; in response to determining that the count is above the threshold, loading the segment of the L2P data structure in working memory of the memory device without writing data portions in the second delete command to the buffer; and updating each record in the segment of the L2P data structure that has a corresponding entry in the second delete command.

In Example 14, the subject matter of Example 13, wherein updating each record in the segment of the L2P data structure that has a corresponding entry in the delete command includes: updating each record in the segment of the L2P data structure that has a corresponding entry in the buffer, an entry being removed from the buffer once a corresponding record is updated.

In Example 15, the subject matter of any of Examples 11-14, wherein the buffer full event is the buffer being beyond a fill level, the fill level measured as a percentage of buffer size or as a value that is smaller than the buffer size.

In Example 16, the subject matter of any of Examples 11-15, wherein the threshold is greater than sixteen kilobytes.

In Example 17, the subject matter of any of Examples 11-16, wherein the threshold is less than one gigabyte.

In Example 18, the subject matter of any of Examples 11-17, wherein the threshold is less than or equal to a size of the buffer.

In Example 19, the subject matter of Example 18, wherein the size of the buffer is less than a size of the segment of the L2P data structure.

In Example 20, the subject matter of any of Examples 11-19, wherein a data portion is a page.

Example 21 is a machine-readable media including instructions for data removal marking in a memory device, the instructions, when executed by processing circuitry, cause processing circuitry to perform operations comprising: receiving a delete command at the memory device; comparing a count of data portions in the delete command to determine whether the count is below a threshold; in response to determining that the count of data portions is below the threshold, writing the data portions in a buffer; detecting a buffer full event; loading a segment of an L2P data structure in working memory of the memory device; and updating each record in the segment of the L2P data structure that has a corresponding entry in the buffer, an entry being removed once a corresponding record is updated.

In Example 22, the subject matter of Example 21, wherein the operations include repeatedly, until the buffer is empty: replacing the segment of the L2P data structure in the working memory with a next segment of the L2P data structure into the working memory; and updating each record in the next segment of the L2P data structure that has a corresponding entry in the buffer.

In Example 23, the subject matter of any of Examples 21-22, wherein the operations comprise: receiving a second delete command at a memory device; comparing a second count of data portions in the second delete command to determine whether the count is above the threshold; in response to determining that the count is above the threshold, loading the segment of the L2P data structure in working memory of the memory device without writing data portions in the second delete command to the buffer; and updating each record in the segment of the L2P data structure that has a corresponding entry in the second delete command.

In Example 24, the subject matter of Example 23, wherein updating each record in the segment of the L2P data structure that has a corresponding entry in the delete command includes: updating each record in the segment of the L2P data structure that has a corresponding entry in the buffer, an entry being removed from the buffer once a corresponding record is updated.

In Example 25, the subject matter of any of Examples 21-24, wherein the buffer full event is the buffer being beyond a fill level, the fill level measured as a percentage of buffer size or as a value that is smaller than the buffer size.

In Example 26, the subject matter of any of Examples 21-25, wherein the threshold is greater than sixteen kilobytes.

In Example 27, the subject matter of any of Examples 21-26, wherein the threshold is less than one gigabyte.

In Example 28, the subject matter of any of Examples 21-27, wherein the threshold is less than or equal to a size of the buffer.

In Example 29, the subject matter of Example 28, wherein the size of the buffer is less than a size of the segment of the L2P data structure.

In Example 30, the subject matter of any of Examples 21-29, wherein a data portion is a page.

Example 31 is a system for data removal marking in a memory device, the system comprising: means for receiving a delete command at the memory device; means for comparing a count of data portions in the delete command to determine whether the count is below a threshold; in response to determining that the count of data portions is below the threshold, means for writing the data portions in a buffer; means for detecting a buffer full event; means for loading a segment of an L2P data structure in working memory of the memory device; and means for updating each record in the segment of the L2P data structure that has a corresponding entry in the buffer, an entry being removed once a corresponding record is updated.

In Example 32, the subject matter of Example 31, comprising, repeatedly, until the buffer is empty: means for replacing the segment of the L2P data structure in the working memory with a next segment of the L2P data structure into the working memory; and means for updating each record in the next segment of the L2P data structure that has a corresponding entry in the buffer.

In Example 33, the subject matter of any of Examples 31-32, comprising: means for receiving a second delete command at a memory device; means for comparing a second count of data portions in the second delete command to determine whether the count is above the threshold; in response to determining that the count is above the threshold, means for loading the segment of the L2P data structure in working memory of the memory device without writing data portions in the second delete command to the buffer; and means for updating each record in the segment of the L2P data structure that has a corresponding entry in the second delete command.

In Example 34, the subject matter of Example 33, wherein the means for updating each record in the segment of the L2P data structure that has a corresponding entry in the delete command include: means for updating each record in the segment of the L2P data structure that has a corresponding entry in the buffer, an entry being removed from the buffer once a corresponding record is updated.

In Example 35, the subject matter of any of Examples 31-34, wherein the buffer full event is the buffer being beyond a fill level, the fill level measured as a percentage of buffer size or as a value that is smaller than the buffer size.

In Example 36, the subject matter of any of Examples 31-35, wherein the threshold is greater than sixteen kilobytes.

In Example 37, the subject matter of any of Examples 31-36, wherein the threshold is less than one gigabyte.

In Example 38, the subject matter of any of Examples 31-37, wherein the threshold is less than or equal to a size of the buffer.

In Example 39, the subject matter of Example 38, wherein the size of the buffer is less than a size of the segment of the L2P data structure.

In Example 40, the subject matter of any of Examples 31-39, wherein a data portion is a page.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other, Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for data removal marking in a memory device, the method comprising:
   receiving a delete command at the memory device;
   comparing a count of data portions in the delete command to determine whether the count is below a threshold;
   in response to determining that the count of data portions is below the threshold, writing the data portions in a buffer;
   detecting a buffer full event;
   loading a segment of an L2P data structure in working memory of the memory device; and
   updating each record in the segment of the L2P data structure that has a corresponding entry in the buffer, an entry being removed once a corresponding record is updated.

2. The method of claim 1, comprising, repeatedly, until the buffer is empty:
   replacing the segment of the L2P data structure in the working memory with a next segment of the L2P data structure into the working memory; and
   updating each record in the next segment of the L2P data structure that has a corresponding entry in the buffer.

3. The method of claim 1, comprising:
   receiving a second delete command at a memory device;
   comparing a second count of data portions in the second delete command to determine whether the count is above the threshold;
   in response to determining that the count is above the threshold, loading the segment of the L2P data structure in working memory of the memory device without writing data portions in the second delete command to the buffer; and
   updating each record in the segment of the L2P data structure that has a corresponding entry in the second delete command.

4. The method of claim 3, wherein updating each record in the segment of the L2P data structure that has a corresponding entry in the delete command includes:
   updating each record in the segment of the L2P data structure that has a corresponding entry in the buffer, an entry being removed from the buffer once a corresponding record is updated.

5. The method of claim 1, wherein the buffer full event is the buffer being beyond a fill level, the fill level measured as a percentage of buffer size or as a value that is smaller than the buffer size.

6. The method of claim 1, wherein the threshold is less than or equal to a size of the buffer.

7. The method of claim 6, wherein the size of the buffer is less than a size of the segment of the L2P data structure.

8. The method of claim 1, wherein a data portion is a page.

9. A non-transitory machine-readable media including instructions for data removal marking in a memory device, the instructions, when executed by processing circuitry, cause processing circuitry to perform operations comprising:
   receiving a delete command at the memory device;
   comparing a count of data portions in the delete command to determine whether the count is below a threshold;
   in response to determining that the count of data portions is below the threshold, writing the data portions in a buffer;
   detecting a buffer full event;
   loading a segment of an L2P data structure in working memory of the memory device; and
   updating each record in the segment of the L2P data structure that has a corresponding entry in the buffer, an entry being removed once a corresponding record is updated.

10. The non-transitory machine-readable media of claim 9, wherein the operations include repeatedly, until the buffer is empty:
    replacing the segment of the L2P data structure in the working memory with a next segment of the L2P data structure into the working memory; and updating each record in the next segment of the L2P data structure that has a corresponding entry in the buffer.

11. The non-transitory machine-readable media of claim 9, wherein the operations comprise:
receiving a second delete command at a memory device;
comparing a second count of data portions in the second delete command to determine whether the count is above the threshold;
in response to determining that the count is above the threshold, loading the segment of the L2P data structure in working memory of the memory device without writing data portions in the second delete command to the buffer; and
updating each record in the segment of the L2P data structure that has a corresponding entry in the second delete command.

12. The non-transitory machine-readable media of claim 11, wherein updating each record in the segment of the L2P data structure that has a corresponding entry in the delete command includes:
updating each record in the segment of the L2P data structure that has a corresponding entry in the buffer, an entry being removed from the buffer once a corresponding record is updated.

13. The non-transitory machine-readable media of claim 9, wherein the buffer full event is the buffer being beyond a fill level, the fill level measured as a percentage of buffer size or as a value that is smaller than the buffer size.

14. The non-transitory machine-readable media of claim 9, wherein the threshold is less than or equal to a size of the buffer.

15. The non-transitory machine-readable media of claim 14, wherein the size of the buffer is less than a size of the segment of the L2P data structure.

16. The non-transitory machine-readable media of claim 9, wherein a data portion is a page.

17. A memory controller for data removal marking in a memory device, the memory controller comprising:
storage including instructions; and
processing circuitry that, when in operation, is configured by the instructions to:
receive a delete command at the memory device;
compare a count of data portions in the delete command to determine whether the count is below a threshold;
in response to a determination that the count of data portions is below the threshold, write the data portions in a buffer;
detect a buffer full event;
load a segment of an L2P data structure in working memory of the memory device; and
update each record in the segment of the L2P data structure that has a corresponding entry in the buffer, an entry being removed once a corresponding record is updated.

18. The memory controller of claim 17, wherein the processing circuitry is configured by the instructions to repeatedly, until the buffer is empty:
replace the segment of the L2P data structure in the working memory with a next segment of the L2P data structure into the working memory; and
update each record in the next segment of the L2P data structure that has a corresponding entry in the buffer.

19. The memory controller of claim 17, wherein the processing circuitry is configured by the instructions to:
receive a second delete command at a memory device;
compare a second count of data portions in the second delete command to determine whether the count is above the threshold;
in response to a determination that the count is above the threshold, load the segment of the L2P data structure in working memory of the memory device without writing data portions in the second delete command to the buffer; and
update each record in the segment of the L2P data structure that has a corresponding entry in the second delete command.

20. The memory controller of claim 3, wherein, to update each record in the segment of the L2P data structure that has a corresponding entry in the delete command, the instructions configure the processing circuitry to:
update each record in the segment of the L2P data structure that has a corresponding entry in the buffer, an entry being removed from the buffer once a corresponding record is updated.

21. The memory controller of claim 17, wherein the buffer full event is the buffer being beyond a fill level, the fill level measured as a percentage of buffer size or as a value that is smaller than the buffer size.

22. The memory controller of claim 17, wherein the threshold is less than or equal to a size of the buffer.

23. The memory controller of claim 22, wherein the size of the buffer is less than a size of the segment of the L2P data structure.

24. The memory controller of claim 17, wherein a data portion is a page.

* * * * *